(12) United States Patent
Zhao et al.

(10) Patent No.: US 7,544,220 B2
(45) Date of Patent: Jun. 9, 2009

(54) WELDING METHODS AND APPARATUS FOR BATTERIES

(75) Inventors: Hailiang Zhao, Maple Grove, MN (US); Kurt J. Casby, Grant, MN (US)

(73) Assignee: Medtronic, Inc., Minneapolis, MN (US)

( * ) Notice: Subject to any disclaimer, the term of this patent is extended or adjusted under 35 U.S.C. 154(b) by 702 days.

(21) Appl. No.: 11/097,686

(22) Filed: Mar. 31, 2005

(65) Prior Publication Data
US 2006/0222942 A1    Oct. 5, 2006

(51) Int. Cl.
  *H01M 2/06* (2006.01)
  *H01M 2/08* (2006.01)
  *H01M 10/04* (2006.01)
(52) U.S. Cl. .................................. 29/623.4; 429/181
(58) Field of Classification Search .................. 429/180, 429/181; 29/623.4
See application file for complete search history.

(56) References Cited

U.S. PATENT DOCUMENTS

| | | | |
|---|---|---|---|
| 4,037,077 A | 7/1977 | Harder et al. | |
| 4,302,518 A | 11/1981 | Goodenough et al. | |
| 4,321,455 A | 3/1982 | Hill et al. | |
| 4,357,215 A | 11/1982 | Goodenough et al. | |
| 4,964,877 A | 10/1990 | Kiester et al. | |
| 5,144,949 A | 9/1992 | Olson | |
| 5,147,737 A | 9/1992 | Post et al. | |
| 5,158,078 A | 10/1992 | Bennett et al. | |
| 5,180,642 A | 1/1993 | Weiss et al. | |
| 5,229,566 A | 7/1993 | Alexandres | |
| 5,250,373 A | 10/1993 | Muffoletto et al. | |
| 5,312,453 A | 5/1994 | Shelton et al. | |
| 5,312,458 A | 5/1994 | Muffuletto et al. | |
| 5,342,409 A | 8/1994 | Mullett | |
| 5,439,760 A * | 8/1995 | Howard et al. | 429/94 |
| 5,458,997 A | 10/1995 | Crespi et al. | |
| 5,468,569 A | 11/1995 | Pyszczek et al. | |
| 5,486,215 A | 1/1996 | Kelm et al. | |
| 5,549,717 A | 8/1996 | Takeuchi et al. | |
| 5,571,146 A | 11/1996 | Jones et al. | |
| 5,811,206 A | 9/1998 | Sunderland et al. | |
| 6,004,692 A | 12/1999 | Muffoletto et al. | |
| 6,447,950 B1 | 9/2002 | Iijima | |
| 6,458,171 B1 | 10/2002 | Tsukamoto | |
| 2002/0161415 A1* | 10/2002 | Cohen et al. | 607/48 |
| 2003/0022062 A1* | 1/2003 | Wutz et al. | 429/178 |
| 2003/0083715 A1 | 5/2003 | Taylor et al. | |
| 2004/0101746 A1* | 5/2004 | Ota et al. | 429/161 |
| 2004/0191621 A1 | 9/2004 | Heller | |
| 2005/0112460 A1* | 5/2005 | Howard et al. | 429/180 |

FOREIGN PATENT DOCUMENTS

WO    WO9741608    11/1997

* cited by examiner

*Primary Examiner*—Gregg Cantelmo
(74) *Attorney, Agent, or Firm*—Scott A. Bardell

(57) ABSTRACT

Embodiments of the invention provide an electrochemical cell including an electrode assembly having one or more of the electrodes being coupled to a feedthrough assembly. The one or more electrodes each include a connection tab. The connection tab extends a distance from separation material between the one or more electrodes (e.g., anode and cathode). The connection tab is provided to contact (e.g., electrically connected) a feedthrough pin of the feedthrough assembly by laser welding. The feedthrough pin with respect to the connection tab is oriented in at least one position lying within a 90 degree orientation on the connection tab. The feedthrough pin is coupled to the connection tab by laser welding.

10 Claims, 10 Drawing Sheets

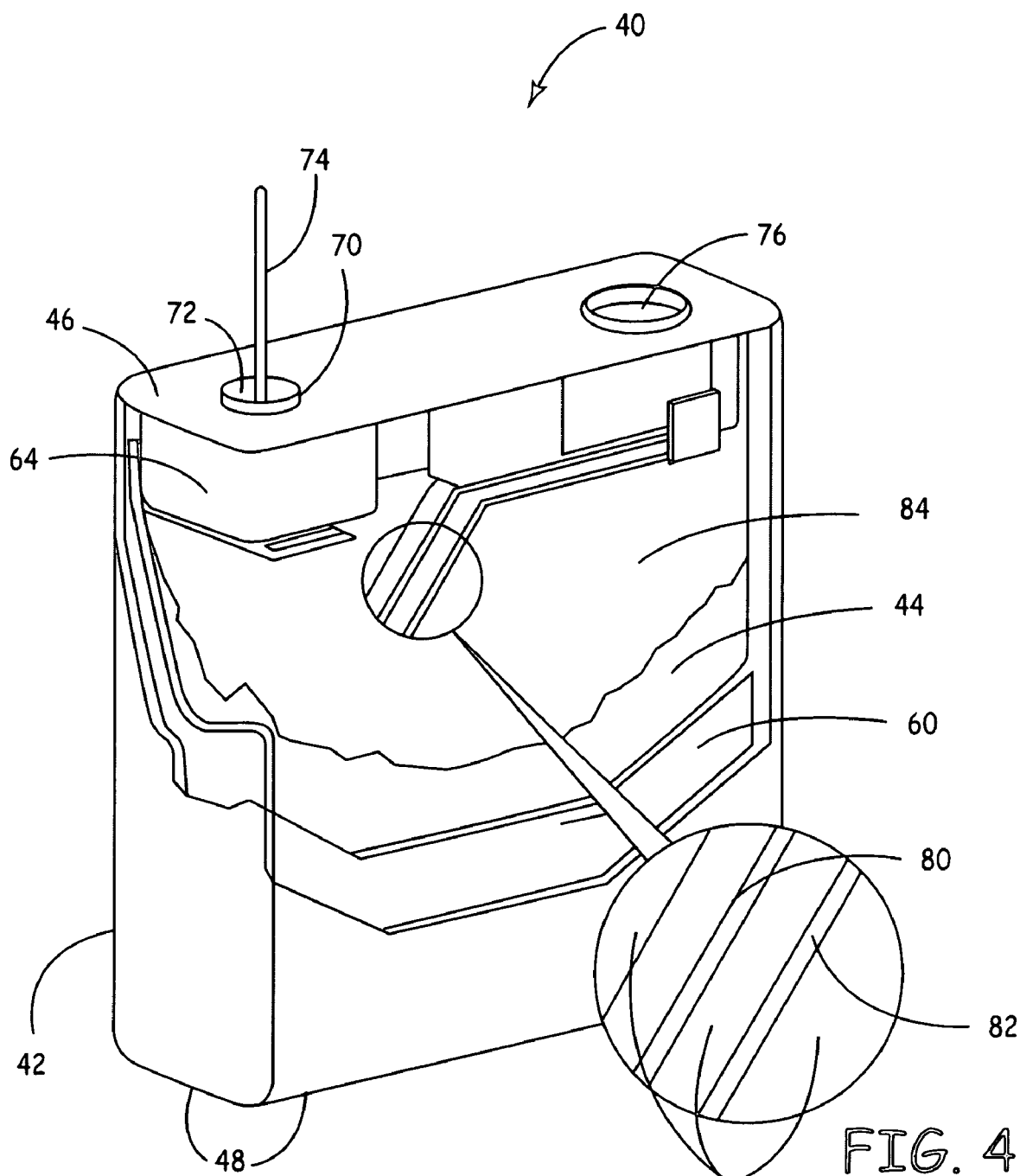

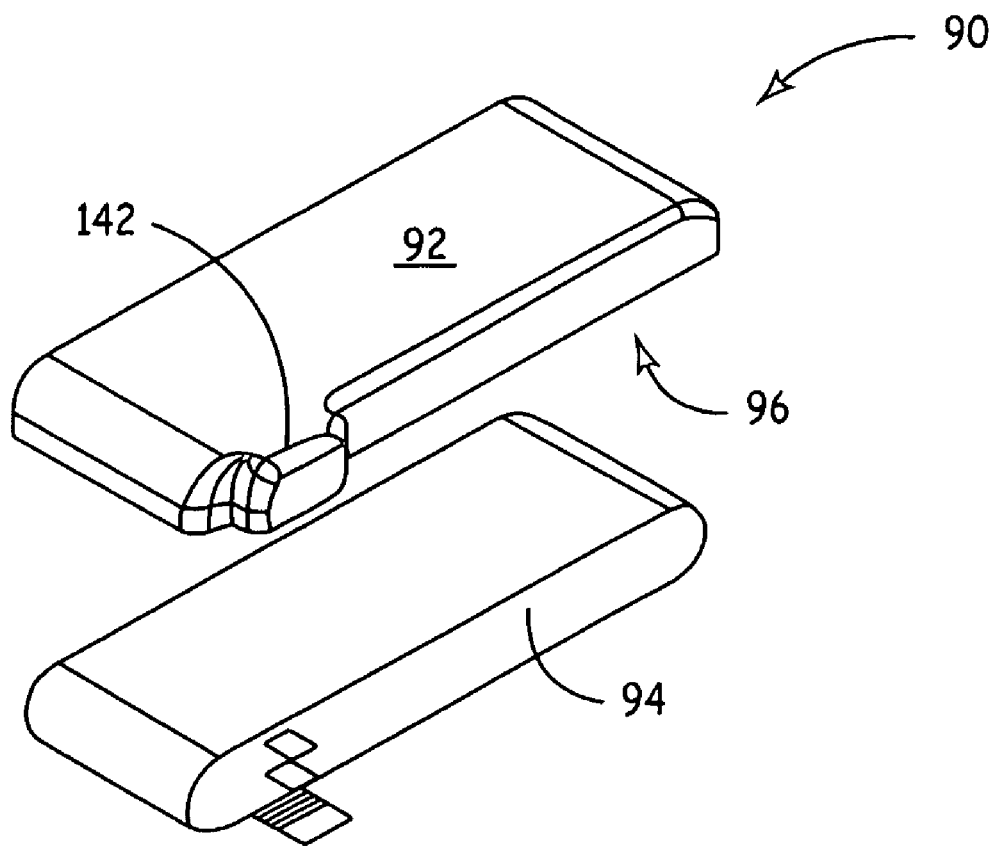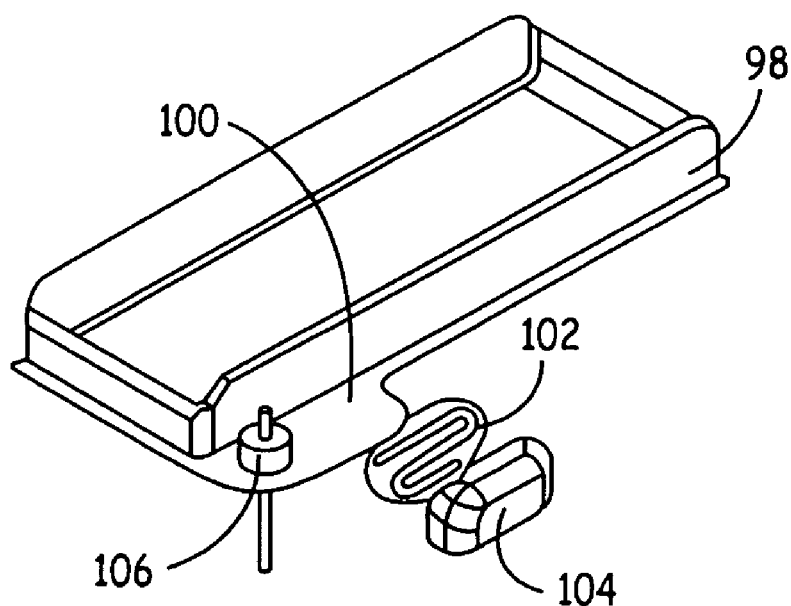
FIG. 6

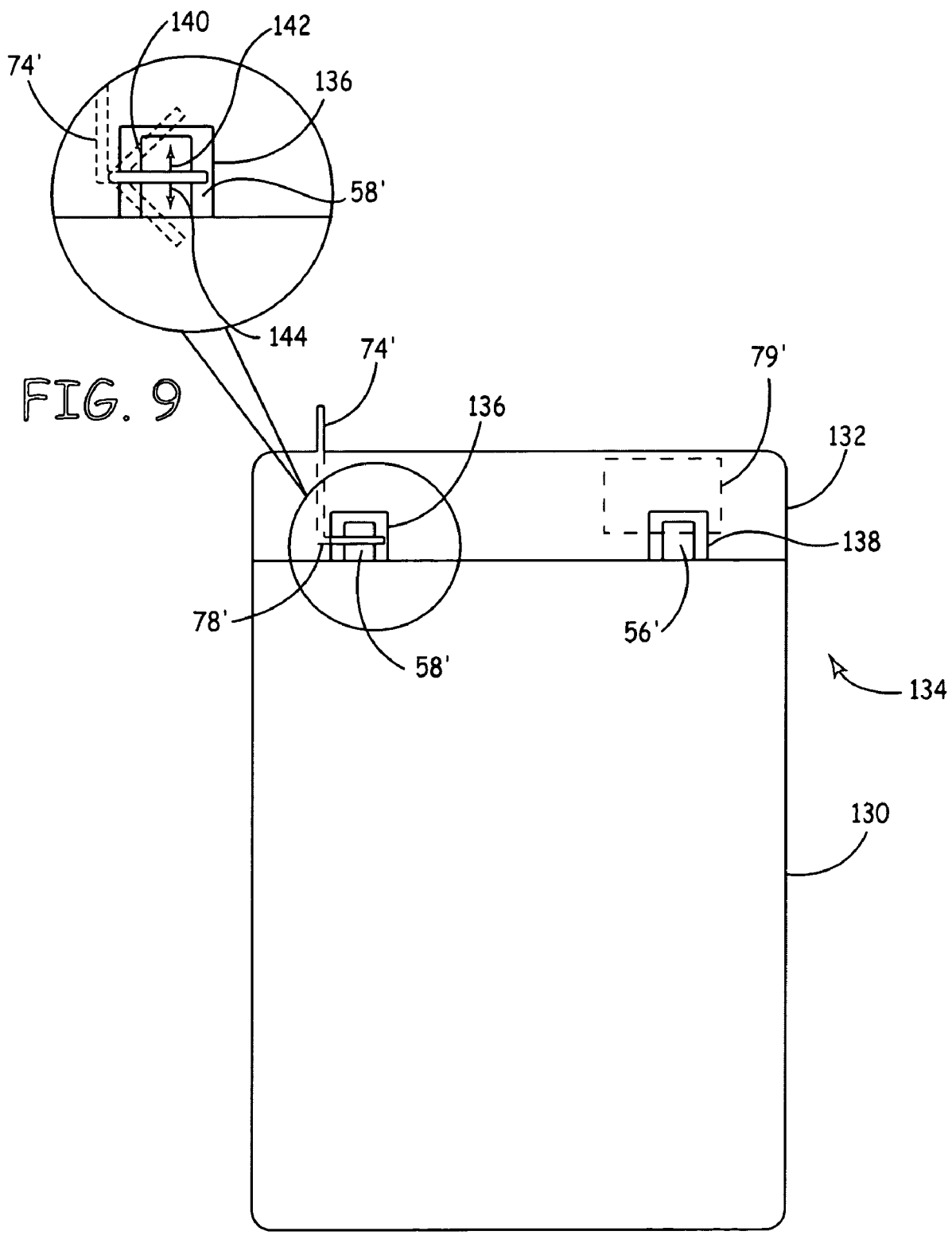

WELDING METHODS AND APPARATUS FOR BATTERIES

FIELD

The disclosure relates generally to coupling methods, and, more particularly, to a battery incorporating a feedthrough pin and current collector which are coupled using such coupling methods, wherein such battery can be used in implantable medical devices.

BACKGROUND SECTION

Implantable medical devices are used to treat patients suffering from a variety of conditions. Examples of implantable medical devices are implantable pacemakers and implantable cardioverter-defibrillators (ICDs), which are electronic medical devices that monitor the electrical activity of the heart and provide electrical stimulation to one or more of the heart chambers, when necessary. For example, pacemakers are designed to sense arrhythmias, i.e., disturbances in heart rhythm, and in turn, provide appropriate electrical stimulation pulses, at a controlled rate, to selected chambers of the heart in order to correct the arrhythmias and restore the proper heart rhythm. The types of arrhythmias that may be detected and corrected by pacemakers include bradycardias, which are unusually slow heart rates, and certain tachycardias, which are unusually fast heart rates.

Implantable cardioverter-defibrillators (ICDs) also detect arrhythmias and provide appropriate electrical stimulation pulses to selected chambers of the heart to correct the abnormal heart rate. In contrast to pacemakers, however, an ICD can also provide pulses that are much stronger and less frequent. This is because ICDs are generally designed to correct fibrillation, which is a rapid, unsynchronized quivering of one or more heart chambers, and severe tachycardias, where the heartbeats are very fast but coordinated. To correct such arrhythmias, ICDs deliver low, moderate, or high-energy shocks to the heart.

Pacemakers and ICDs are preferably designed with shapes that are easily accepted by the patient's body while minimizing patient discomfort. As a result, the corners and edges of the devices are typically designed with generous radii to present a package having smoothly contoured surfaces. It is also desirable to minimize the volume and mass of the devices to further limit patient discomfort.

The electrical energy for the shocks delivered by ICDs is generated by delivering electrical current from a power source (battery) to charge capacitors with stored energy. The capacitors are capable of rapidly delivering that energy to the patient's heart. In order to provide timely therapy to the patient after the detection of ventricular fibrillation, for example, it is necessary to charge the capacitors with the required amount of energy as quickly as possible. Thus, the battery in an ICD must have a high rate capability to provide the necessary current to charge the capacitors. In addition, since ICDs are implanted in patients, the battery must be able to accommodate physical constraints on size and shape.

Batteries or cells are volumetrically constrained systems. The sizes or volumes of components that are contained within a battery (cathode, anode, separator, current collectors, electrolyte, etc.) cannot in total exceed the available volume of the battery case. The arrangement of the components affects the amount or density of active electrode material, which can be contained within the battery case.

Conventional lithium batteries can employ an electrode configuration sometimes referred to as the "jelly roll" design, in which anode, cathode and separator elements are overlaid and coiled up in a spiral wound form. Generally, a strip sheet of lithium or lithium alloy comprises the anode, a cathode material supported on a charge collecting metal screen comprises the cathode, and a sheet of non-woven material separates the anode and cathode elements. These elements are combined and wound to form a spiral. Typically, the battery configuration for such a wound electrode is cylindrical. An advantage of this design is no more anode material is needed than what is mated to cathode material in the jelly roll electrode configuration. Such designs therefore have the potential for an improved match between the cathode and anode components and improved uniformity of anode and cathode utilization during discharge.

Typically, a battery includes corrosive material (e.g., the electrolyte). Any leakage of the corrosive material may undesirably damage the battery and/or the electrical components of the device (e.g., the implantable medical device) that the battery is used with. Such damage may generally cause the device to function improperly or otherwise cause it to cease operating altogether. In addition, if used in a medical device surgically implanted within a patient's body, as described above, accessibility to the device may be difficult for repair or replacement.

One approach to isolating the corrosive material involves using an electrical feedthrough arrangement for the battery to function as an intermediary. The feedthrough arrangement is designed to provide electrical connection between the battery and the other electrical components of the implantable medical device, and to maintain environmental isolation between the corrosive material within the battery and the other electrical components within the device. This isolation is, in part, achieved by using feedthrough pins that are generally corrosion resistant. However, effectively coupling these pins to the one or more of the electrodes in contact with the corrosive material within the battery can be difficult.

Coupling between the pins and the electrodes, e.g., by coupling the pins to tabs extending from the electrodes, can be difficult for several reasons. One reason involves differences in the physical properties of the pins and the tabs. This dissimilarity in material properties can lead to brittle joints or other unacceptable performance-related problems. To address such problems, current coupling methods have often involved manipulating the tab and/or the feedthrough pin for initial retention purposes before using a coupling process (e.g., resistance spot welding) to achieve a secure joint between the tab and pin. Unfortunately, these methods have been found to be highly sensitive to manufacturing variability (e.g., based on surface conditions of the pin), resulting in unstable manufacturing yield.

The present invention is directed to overcoming, or at least reducing the effects of, one or more of the problems set forth above.

BRIEF SUMMARY OF THE INVENTION

Embodiments of the invention provide an electrochemical cell including an electrode assembly having one or more of the electrodes being coupled to a feedthrough assembly. The one or more electrodes each include a connection tab. The connection tab extends a distance from separation material between the one or more electrodes (e.g., anode and cathode). The connection tab is provided to contact (e.g., electrically connected) a feedthrough pin of the feedthrough assembly via laser welding. The feedthrough pin with respect to the connection tab is oriented in at least one position lying within a 90 degree orientation on the connection tab. The feedthrough pin is coupled to the connection tab via laser welding.

If such pin and tab are coupled using laser welding, such coupling has been found to provide a joint that is superior than joints formed using other coupling methods (e.g., resistance spot welding). If the coupling method is further provided with the use of a fixture that temporally retains the tab and pin during the coupling process, the method has been found to reduce variability in joint strength properties, (e.g., by improving the repeatability of the process), leading to greater overall yield.

In other embodiments, a method of manufacturing an electrochemical cell is provided. The method involves a step of providing an battery coil having an electrode assembly, wherein the electrode assembly has one or more electrodes. Each of the one or more electrodes has a tab extending therefrom. An additional step involves providing a battery header having a first feedthrough assembly, wherein the first feedthrough assembly has a feedthrough pin extending therefrom. Also, a step involves joining the battery coil with the battery header so as to form a joined unit whereby a first feedthrough pin of the battery header extends across a first tab of the battery coil and at least one of a coupling and a second feedthrough pin. Further, a step involves providing a platform for the joined unit, wherein the platform has a plurality of securing members, a heat sink, and a shield. Additionally, a step involves positioning the joined unit on the platform so that the first tab contacts the heat sink. A step also involves securing the joined unit to the platform using one or more securing members. An additional step involves positioning the shield so as to protect the battery coil during coupling of the first feedthrough pin and the first tab. A further step involves coupling the first feedthrough pin to the first tab via laser welding at a point where the first feedthrough pin contacts the first tab.

BRIEF DESCRIPTION OF THE DRAWINGS

FIG. 3 is a cutaway perspective view of a battery in accordance with certain embodiments of the invention;

FIG. 4 is a partial cross section of an battery coil of the battery of FIG. 3;

FIG. 6 is an exploded perspective view of a battery in accordance with certain embodiments of the invention;

FIG. 8 is a plan view of a joined unit of an electrochemical cell in accordance with certain embodiments of the invention;

FIG. 9 is an enlarged sectional view of a portion of FIG. 8;

DETAILED DESCRIPTION OF THE PREFERRED EMBODIMENTS

Figure 1:
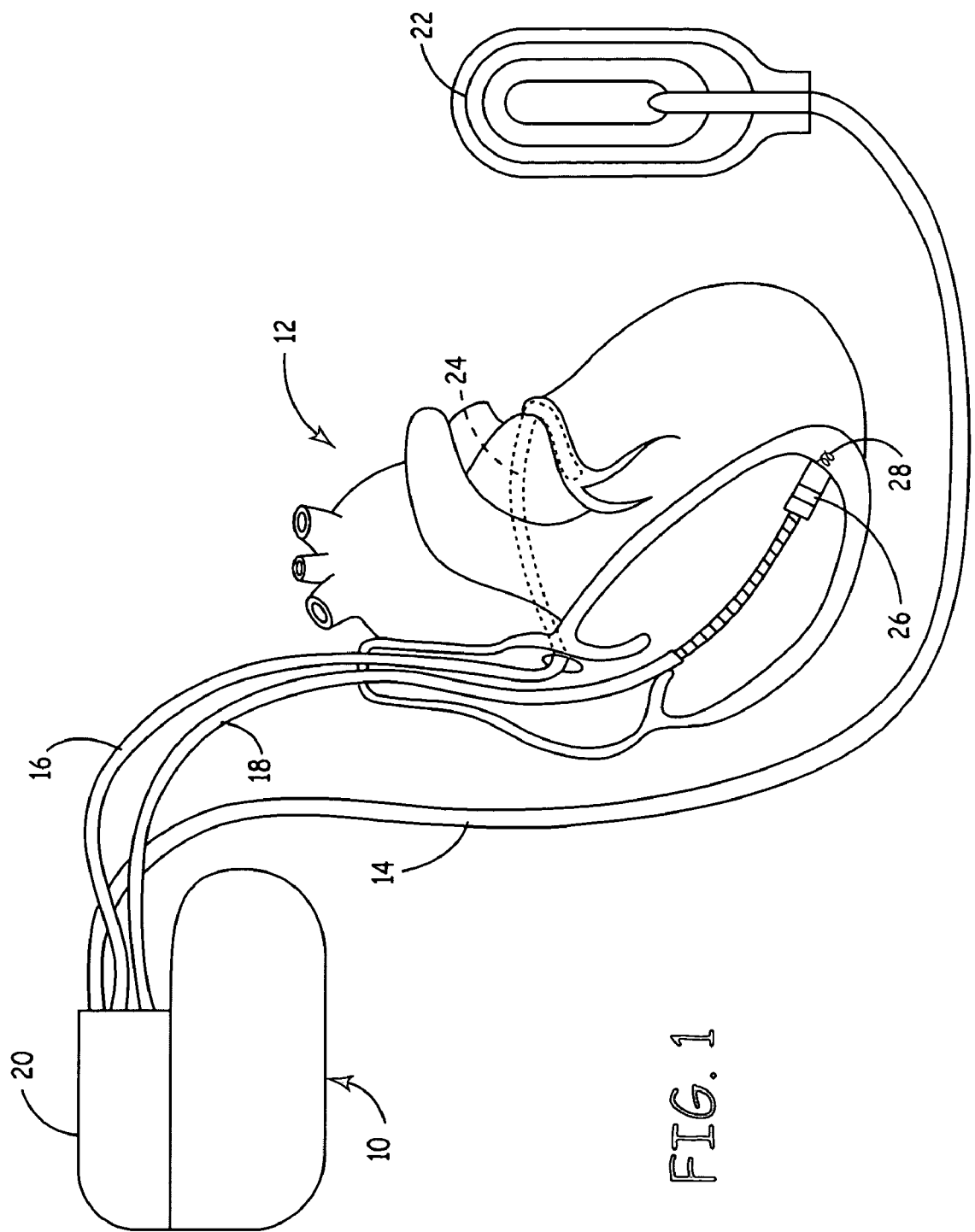
FIG. 1 is a simplified schematic view of an exemplary implantable medical device (IMD) incorporating an electrochemical cell in accordance with certain embodiments of the invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

The present invention is not limited to any one type of application for batteries. For example, while embodiments are described and shown herein illustrating batteries in medical devices with respect to medical applications, the present invention should not be limited as such. However, when applied to medical applications, the batteries herein should not be limited to any one type of medical device, implantable or otherwise. Instead, if applied in medical technologies, the present invention can be employed in many various types of electronic and mechanical devices designed to have a minimum device volume, for example, in medical devices for treating patient conditions such as pacemakers, defibrillators, neurostimulators, and therapeutic substance delivery pumps. It is to be further understood that the present invention is not limited to high current batteries and may be utilized for low or medium current batteries. For purposes of illustration though, the present invention is below described in the context of high current batteries.

FIG. 1 is a simplified schematic view of an implantable medical device ("IMD") 10. The IMD 10 is shown in FIG. 1 as a pacemaker/cardioverter/defibrillator (PCD) with a relationship to a human heart 12. However, the IMD 10 shown may assume a wide variety of forms. For example, the IMD 10 may be an implantable cardiac defibrillator (ICD as is known in the art). Alternatively, or in addition, the IMD 10 may be an implantable cardiac pacemaker, such as that disclosed in U.S. Pat. No. 5,158,078 to Bennett et al.; U.S. Pat. No. 5,312,453 to Shelton et al.; or U.S. Pat. No. 5,144,949 to Olson, all hereby incorporated by reference, each in its entirety. Even further, the IMD 10 may be an implantable neurostimulator, such as that described, for example, in U.S. Pat. No. 5,342,409 to Mullet; or an implantable drug pump; a cardiomyostimulator; a biosensor; and the like.

The IMD 10 includes associated electrical leads 14, 16 and 18, although it should be appreciated that the IMD 10 can include any number of leads suitable for a particular application. The leads 14, 16 and 18 are coupled to the IMD 10 by means of a multi-port connector block 20, which contains separate ports for each of the leads 14, 16, and 18. Lead 14 is coupled to a subcutaneous electrode 22, which is intended to be mounted subcutaneously in the region of the left chest. Alternatively, an active "can" may be employed. Lead 16 is a coronary sinus lead employing an elongated coil electrode 24 that is located in the coronary sinus and great vein region of the heart 12. The location of this elongated coil electrode 24 is illustrated in broken line format in FIG. 1, and extends around the heart 12 from a point within the opening of the coronary sinus to a point in the vicinity of the left atrial appendage. Lead 18 is also provided with an elongated electrode coil 26, which is located in the right ventricle of heart 12. Lead 18 also includes a helical stimulation electrode 28, which takes the form of an advanceable helical coil that is screwed into the myocardial tissue of the right ventricle. Lead 18 may also include one or more additional electrodes for near and far field electrogram sensing.

In the system illustrated, cardiac pacing pulses are delivered between the helical electrode 28 and the elongated electrode 26. The electrodes 26 and 28 are also employed to sense electrical signals indicative of ventricular contractions. As illustrated, the right ventricular electrode 26 can generally serve as the common electrode during sequential and simultaneous pulse multiple electrode defibrillation regimens. For example, during a simultaneous pulse defibrillation regimen, pulses can simultaneously be delivered between electrode 26 and electrode 22, and between electrode 26 and electrode 24. During sequential pulse defibrillation, pulses can be delivered sequentially between subcutaneous electrode 22 and electrode 26, and between coronary sinus electrode 24 and electrode 26. Single pulse, two electrode defibrillation pulse regimens may also be provided, typically between electrode 26 and coronary sinus electrode 24. Alternatively, single pulses may be delivered between electrodes 26 and 22. The particular interconnection of the electrodes to the IMD 10 will generally depend on which specific single electrode pair defibrillation pulse regimen is likely to be employed.

Figure 2:
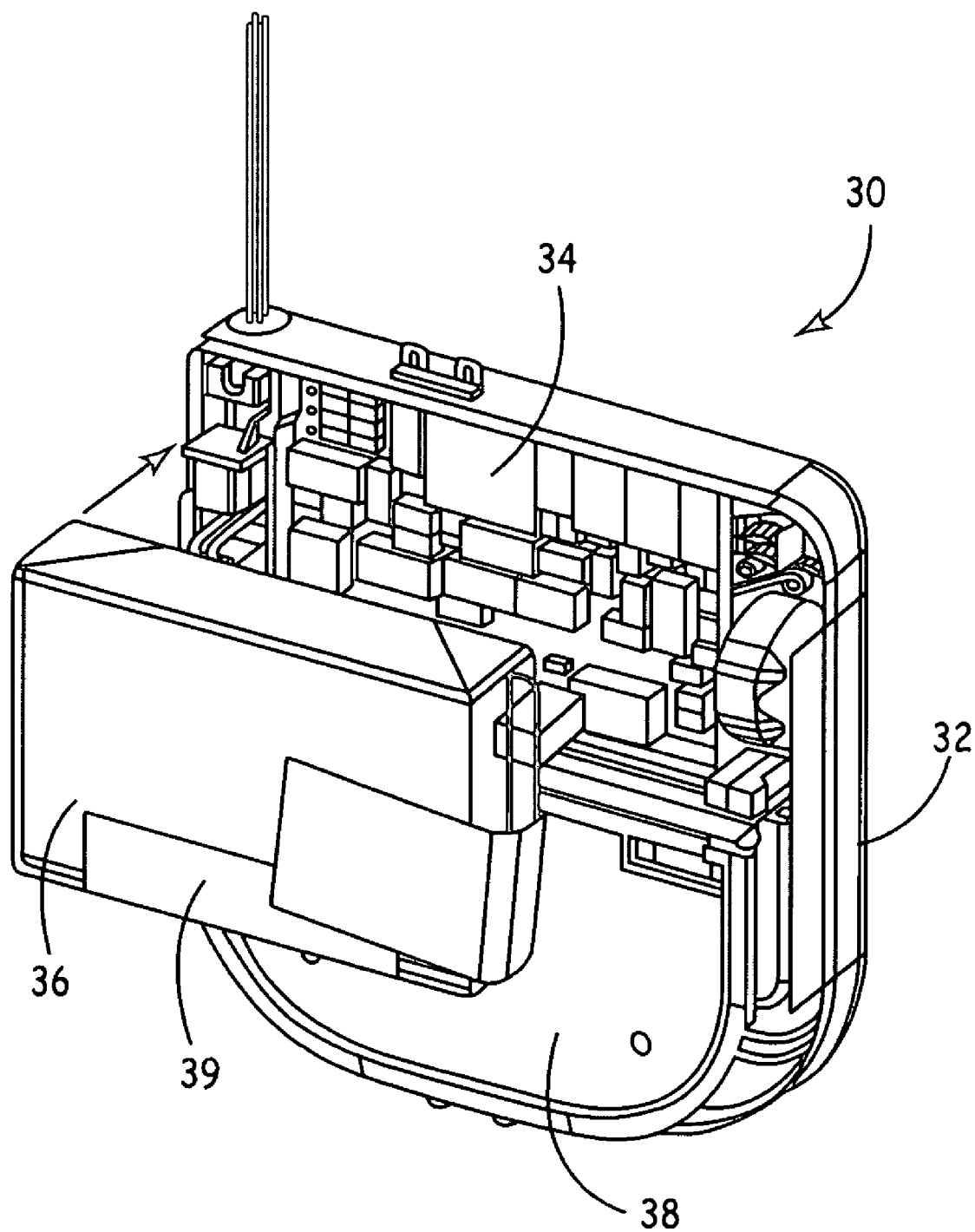
FIG. 2 is an exploded perspective view of an IMD without cover in accordance with certain embodiments of the invention.

As previously described, the IMD 10 can assume a wide variety of forms as are known in the art. Generally, IMDs include one or more of the following elements: (a) a device housing (e.g., a case), (b) one or more capacitors disposed within the device housing, (c) a battery disposed within the device housing and operatively connected to the capacitor, and (d) circuitry disposed within the device housing providing electrical connection between the battery and the capacitor. Exemplary illustrations and general locations of such elements in an IMD 30 are shown in FIG. 2. As shown, the IMD 30 includes a case 32 (the device housing), an electronics module 34 (the circuitry), an electrochemical cell 36 (the battery), and capacitor(s) 38. Each of these components of the IMD 30 is preferably configured for one or more particular end-use applications. For example, the electronics module 34 is configured to perform one or more sensing and/or stimulation processes. The electrochemical cell 36 provides the electrical energy to charge and re-charge the capacitor(s) 38, and to also power the electronics module 34. The electrochemical cell 36 generally includes an insulator 39 disposed there around. According to certain embodiments, the electrochemical cell 36 may take the form of a rechargeable (secondary) lithium-ion battery, which may incorporate a negative active material comprised of Carbon, a positive active material of a lithium transition metal oxide, such as $LiCoO_2$, for example, and a lithium containing salt, such as $LiPF_6$ and an appropriate organic solvent for the $LiPF_6$ salt, for example. In other certain embodiments, the electrochemical cell 36 may be provided as a non-rechargeable (primary) lithium battery. It should be appreciated that the electrochemical cell 36 may take the form of various other battery types or electrochemical cells, either active or passive (battery packs), and, thus need not necessarily be limited to the aforementioned examples.

Electrochemical cells generally include one or more of the following components: (a) an electrode assembly including one or more of an anode and a cathode, (b) an electrolyte, and (c) a housing within which the electrode assembly and the electrolyte are disposed. In certain embodiments, the housing includes one or more of the following elements: (a) a cover, (b) a case with an open top to receive the cover, (c) at least one feedthrough assembly providing electrical communication from a first electrode of the electrode assembly and the implantable medical device circuitry (e.g., the electronics module 34), (d) a coupling providing electrical connection between the at least one feedthrough assembly and a first electrode of the electrode assembly, and (e) a coupling providing electrical connection between the case (or another feedthrough assembly) and a second electrode of the electrode assembly. The housing further contains one or more insulators including (a) a cover insulator adjacent to the cover providing a barrier between the electrode assembly and the cover, (b) a case insulator adjacent to the case providing a barrier between the electrode assembly and the case, and (c) a headspace insulator adjacent to the electrode assembly (e.g., proximate to the insulator adjacent to the cover) providing a barrier between the electrode assembly and the case.

FIG. 3 illustrates a cutaway perspective view of a battery or electrochemical cell in accordance with an exemplary embodiment of the present invention. A battery 40 is illustrated having a long drawn battery case 42 and an electrode assembly 44. The battery case 42 is generally made of a medical grade titanium; however, it is contemplated that the case 42 could be made of almost any type of metal such as aluminum and stainless steel, as long as the metal is compatible with the battery's chemistry in order to prevent corrosion. Further, it is contemplated the battery case 42 can be manufactured from most any process including but not limited to machining, casting, drawing, or metal injection molding. The battery case 42 is designed to enclose the electrode assembly 44 and be sealed with a battery cover 46. While sides 48 of the battery case 42 are generally planar, it is contemplated the sides 48 could be generally arcuate in shape. This construction would provide a number of advantages including the ability to accommodate one of the curved or arcuate ends of the electrode assembly 44 (e.g., if the assembly 44 were coiled). Arcuate sides could also nest within an arcuate edge of an implantable medical device, such as an implantable cardiac defibrillator.

FIG. 6 shows an exploded perspective view of a battery 90 in accordance with an exemplary embodiment of the present invention. The battery 90 is illustrated having a shallow drawn battery case 92 and an electrode assembly 94. Other elements shown include a battery case liner 96 (within battery case 92, not visibly shown), an insulator 98, a battery cover 100, a coupling 102, a headspace cover 104, and a feedthrough assembly 106. The battery case 92 is designed to enclose the electrode assembly 94 and be sealed with the battery cover 100. In certain embodiments, the electrode assembly 94 is hermetically sealed within the battery 90.

As used herein, the terms battery or batteries include a single electrochemical cell or cells. Batteries are volumetrically constrained systems in which the components of the battery cannot exceed the available volume of the battery case. Furthermore, the relative amounts of some of the components can be important to provide the desired amount of energy at the desired discharge rates. A discussion of the various considerations in designing the electrodes and the desired volume of electrolyte needed to accompany them in, for example, a lithium/silver vanadium oxide (Li/SVO) battery, is discussed in U.S. Pat. No. 5,458,997 (Crespi et al.). Generally, however, the battery must include the electrodes and additional volume for the electrolyte required to provide a functioning battery. In certain embodiments, the battery is hermetically sealed.

In certain embodiments, the batteries are directed to high current batteries that are capable of charging capacitors with the desired amount of energy in the desired amount of time. In certain embodiments, the desired amount of energy is typically at least about 20 joules. Further embodiments involve the energy amount being about 20 joules to about 40 joules. In certain embodiments, the desired amount of time is no more than about 20 seconds. Further embodiments involve the desired amount of time being no more than about 10 seconds. These energy and time values can typically be attained during the useful life of the battery as well as when the battery is new. As a result, in certain embodiments, the batteries typically deliver up to about 5 amps at about 1.5 to about 2.5 volts, in contrast to low rate batteries that are typically discharged at much lower currents. Furthermore, the batteries are able to provide these amounts of energy repeatedly. In certain embodiments, the battery can provide these amounts of energy with a time delay of no more than about 30 seconds. Further embodiments involve the time delay being no more than about 10 seconds.

The details regarding construction of the electrode assemblies 44 and 94 of FIGS. 3 and 6 respectively, with respect to electrodes and additional elements, are generally described below. The electrode assemblies 44 and/or 94 can be wound or coiled structures similar to those disclosed in, e.g., U.S. Pat. No. 5,486,215 (Kelm et al.). The electrode assemblies 44 and/or 94 can also be part of batteries in which the electrode types include spirally-wound, stacked plate, or serpentine, as disclosed, for example, in U.S. Pat. Nos. 5,312,458 and 5,250,373 to Muffuletto et al. for "Internal Electrode and Assembly Method for Electrochemical Cells;" U.S. Pat. No. 5,549,717 to Takeuchi et al. for "Method of Making Prismatic Cell;" U.S. Pat. No. 4,964,877 to Kiester et al. for "Non-Aqueous Lithium Battery;" U.S. Pat. No. 5,147,737 to Post et al. for "Electrochemical Cell With Improved Efficiency Serpentine Electrode;" and U.S. Pat. No. 5,468,569 to Pyszczek et al. for "Use of Standard Uniform Electrode Components in Cells of Either High or Low Surface Area Design," the disclosures of which are hereby incorporated by reference herein in their respective entireties. Alternatively, in certain embodiments, the batteries 40 and 90 of FIGS. 3 and 6 respectively, and/or electrochemical cell 54 of FIG. 2, can include single cathode electrodes as described, for example, in U.S. Pat. No. 5,716,729 to Sunderland et al. for "Electrochemical Cell," which is hereby incorporated by reference in its entirety. The composition of the electrode assemblies 44 and 94 can vary. An exemplary electrode assembly includes a wound core of lithium/silver vanadium oxide (Li/SVO) battery as discussed in, e.g., U.S. Pat. No. 5,458,997 (Crespi et al.). Other battery chemistries are also anticipated, such as those described in U.S. Pat. No. 5,180,642 (Weiss et al) and U.S. Pat. Nos. 4,302,518 and 4,357,215 (Goodenough et al).

With reference to FIG. 3, a partial cutaway perspective view of the electrode assembly 44 of the battery 40 is shown in FIG. 4. As illustrated, the electrode assembly 44 generally includes a second electrode 80, a first electrode 82, and a porous, electrically non-conductive separator material 84 encapsulating either one or both of the second electrode 80 and the first electrode 82. These three components are generally placed together to form the electrode assembly 44.

The second electrode 80 of the electrode assembly 44 can comprise a number of different materials. Generally, the second electrode 80 includes a second electrode active material located on a second electrode conductor element. In certain embodiments, the second electrode 80 is an anode in the case of a primary cell or the negative electrode in the case of a rechargeable cell. Examples of suitable materials for such anode or negative electrode include, but are not limited to, stainless steel, nickel, or titanium. Examples of suitable second electrode active materials include, but are not limited to, alkali metals, materials selected from Group IA of the Periodic Table of Elements, including lithium, sodium, potassium, etc., and their alloys and intermetallic compounds including, e.g., Li—Si, Li—B, and Li—Si—B alloys and intermetallic compounds, insertion or intercalation materials such as carbon, or tin-oxide.

The first electrode 82 of the electrode assembly 44 generally includes a first electrode active material located on a first electrode current collector. In certain embodiments, the first electrode 82 is a cathode in the case of a primary cell or the positive electrode in the case of a rechargeable cell, and enables the flow of electrons between the first electrode active material and first electrode terminals of the electrode assembly 44. Generally, the cathode or positive electrode comprises a mixed metal oxide formed by chemical addition, reaction or otherwise intimate contact or by thermal spray coating process of various metal sulfides, metal oxides or metal oxide/elemental metal combinations. Generally, such mixed metal oxides will correspondingly contain metals and oxides of Groups IB, IIB, IIIB, IVB, VB, VIIB, VIIB, and VIII of the Periodic Table of Elements, which includes noble metals and/or their oxide compounds. The first electrode active materials can include, but are not limited to, a metal oxide, a mixed metal oxide, a metal, and combinations thereof. Suitable first electrode active materials include, but are not limited to, silver vanadium oxide (SVO), copper vanadium oxide, copper silver vanadium oxide (CSVO), manganese dioxide, titanium disulfide, copper oxide, copper sulfide, iron sulfide, iron disulfide, and fluorinated carbon, and mixtures thereof, including lithiated oxides of metals such as manganese, cobalt, and nickel. First cathode and positive electrode materials can also be provided in a binder material such as a fluoro-resin powder; generally polyvinylidine fluoride or polytetrafluoroethylene (PTFE) powder also includes another electrically conductive material such as graphite powder, acetylene black powder, and carbon black powder. In some cases, however, no binder or other conductive material is required for the first electrode.

The separator material 84 is typically used to electrically insulate the second electrode 80 from the first electrode 82. The material is generally wettable by the cell electrolyte, sufficiently porous to allow the electrolyte to flow through the separator material 84, and configured to maintain physical and chemical integrity within the cell during operation. Examples of suitable separator materials include, but are not limited to, polyethylenetetrafluoroethylene, ceramics, non-woven glass, glass fiber material, polypropylene, and polyethylene. As illustrated, the separator 84 may consist of three layers, in which a polyethylene layer is sandwiched between two layers of polypropylene. The polyethylene layer has a lower melting point than the polypropylene and provides a shut down mechanism in case of cell overheating. The electrode separation is different than other lithium-ion cells in that two layers of separator are used between the second electrode 80 and the first electrode 82. Generally, the electrolyte solution can be an alkali metal salt in an organic solvent such as a lithium salt (i.e. 1.0M $LiClO_4$ or $LiAsF_6$) in a 50/50 mixture of propylene carbonate and dimethoxyethane.

Figure 5:
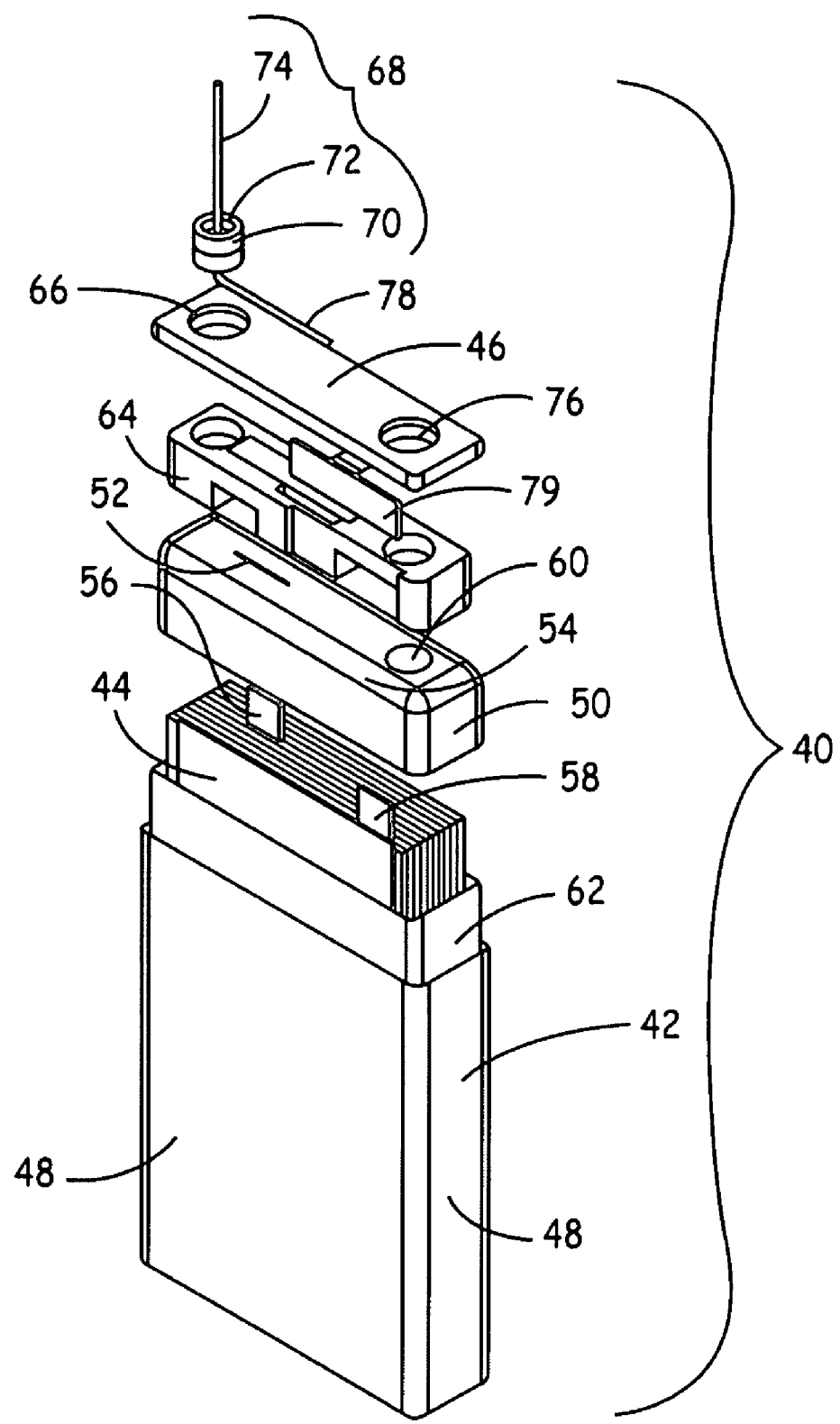
FIG. 5 is an exploded perspective view of the battery of FIG. 3.

FIG. 5 illustrates a exploded view of the battery 40 shown in FIG. 3. Some of the reference numbers shown in FIG. 5 are also referenced in FIG. 3, yet have not been previously described herein. The battery 40 is shown with a coil insulator 50 that is located on an upper portion of the electrode assembly 44 when assembled. The coil insulator 50 includes slits 52 and 54 to accommodate first electrode tab 56 and second electrode tab 58 respectively, and further includes an aperture 60 to allow electrolyte to flow to the electrode assembly 44. Generally, the coil insulator 50 is comprised of ETFE (Ethylene Tetrafluoroethylene), however, it is contemplated other materials could be used such as HDPE (high density polyethylene), polypropylene, polyurethane, fluoropolymers, silicone rubber, and the like. The coil insulator 50 performs several functions including working in conjunction with an electrically non-conductive battery case liner 62 to isolate the battery case 42 and the battery cover 46 from the electrode assembly 44. It also provides mechanical stability for the electrode assembly 44.

The electrode assembly 44 is generally inserted into the case liner 62 during assembly. The case liner 62 generally extends at its top edge above the edge of the electrode assembly 44 to overlap with the coil insulator 50. The case liner 62 is generally comprised of ETFE, however, other types of materials are contemplated such as HDDE, polypropylene, polyurethane, fluoropolymers, silicone rubber, and the like. The case liner 62 generally has substantially similar dimensions to the battery case 42 except the case liner 62 would have slightly smaller dimensions so that the liner 62 can rest inside the battery case 42.

FIG. 5 further depicts features of the battery cover 46. Similar to the battery case 42, the battery cover 46 is comprised of a medical grade titanium to provide a strong and reliable weld creating a seal with battery case 42. In certain embodiments, a hermetic seal is created. It is also contemplated that the cover 46 could be made of any type of material so long as the material is electrochemically compatible. The battery cover 46 includes a feedthrough aperture 66 through which the feedthrough assembly 68 is inserted. The feedthrough assembly 68 contains a ferrule 70, an insulating member 72, and a feedthrough pin 74. In certain embodiments, the feedthrough pin 74 is formed of aluminum containing titanium alloy, as is described in U.S. patent application Ser. No. 10/003,925, the disclosure of which is incorporated herein by reference. Accordingly, when such is used as the feedthrough pin 74, the likelihood of the pin 74 corroding is reduced, and thus, the likelihood of the corrosive materials escaping from the battery housing is reduced as well. However, it should be appreciated that any conductive material could be utilized for the feedthrough pin 74 without departing from the spirit of the invention. Another material example is niobium, which is generally chosen for its low resistivity, its material compatibility during welding with titanium, and its coefficient of expansion when heated. Niobium and titanium are compatible metals, meaning when they are welded together, a strong reliable weld is created.

The feedthrough pin 74 is generally conductively insulated from the battery cover 46 by the insulated member 72, and passes through the feedthrough aperture 66 of the cover 46 through the ferrule 70. The insulating member 72, which is generally comprised of CABAL-12 (calcium-boro-aluminate), TA-23 glass or other glasses, provides electrical isolation of the feedthrough pin 74 from the battery cover 46. The pin material is in part selected for its ability to join with the insulating member 72, which results in a hermetic seal. As mentioned above, the pin material is also selected to be corrosion resistant. CABAL-12 is also generally corrosion resistant and a good insulator. Therefore, CABAL-12 provides good insulation between the feedthrough pin 74 and the battery cover 46 and is resistant to the corrosive effects of the electrolyte. However, other materials besides glass can be utilized, such as ceramic materials, without departing from the spirit of the invention. The battery cover 46 also includes a fill port 76 used to introduce an appropriate electrolyte solution after which the fill port 76 is sealed (e.g., hermetically) by any suitable method.

A headspace insulator 64 is generally located below the battery cover 46 and above the coil insulator 50, e.g., in the headspace above the electrode assembly 44 and below the battery cover 46. Generally, the headspace insulator 64 is comprised of ETFE; however, other insulative materials are contemplated such as HDDE, polypropylene, polyurethane, fluoropolymers, silicone rubber, and the like. ETFE is stable at the potentials of both the second electrode 80 and first electrode 82 and has a relatively high melting temperature. The headspace insulator 64 can cover the first electrode tab 56, and the second electrode tab 58, and a distal end 78 of the feedthrough pin 74. While the electrode assembly 44 is described as having first and second electrode tabs 56 and 58 respectively, it is fully contemplated each electrode could have one or more tabs without departing from the spirit of the invention. The headspace insulator 64 is designed to provide thermal protection to the electrode assembly 44 from the weld joining the battery case 42 and the battery cover 46. Such protection is provided through the introduction of an air gap between the headspace insulator 64 and the battery cover 46 in the area of the battery case 42 to cover the weld. The insulator 64 prevents electrical shorts by providing electrical insulation between the first electrode tab 56 and the second electrode tab 58. In certain embodiments, a coupling 79 (e.g., a weld bracket), is used to serve as the conductor between the first electrode tab 58 and the battery cover 46 or the battery case 42. In certain embodiments, the coupling 79 is a nickel foil piece that is welded to both the battery cover 46 and the first electrode tab 56.

The long and shallow drawn batteries 40 (and 90) of FIGS. 3 and 5 (and 6) generally include three major functional portions: (a) encasement, (b) insulation, and (c) active components. The encasement or enclosure portion includes the battery case 42 including its headspace (case 92 in FIG. 6), the battery cover 46 (100 in FIG. 6), the feedthrough assembly 68 (106 in FIG. 6), and electrical connections. The encasement generally provides a seal (e.g., a hermetic seal), a port for adding electrolyte, and isolated electrical connections. The insulators generally prevent electrical shorts. The insulators include the headspace insulator 64 (104 in FIG. 6), the coil insulator 50 (98 in FIG. 6), and the case liner 62 (96 in FIG. 6). The active components provide the electrochemistry/energy storage functioning of the battery 40 (and 90). The active components include the electrolyte and the electrode assembly 44 (94 in FIG. 6). With the batteries 40 and 90 of FIGS. 3 and 5 and FIG. 6 having similar configurations, it should be appreciated that both are equally applicable to the present invention. As such, if embodiments of the invention are described herein with respect to only one of the batteries 40 or 110, it should not be limited as such. Also, if embodiments of the invention are represented in the figures by a single tab, the invention should not be limited as such.

As described herein, an electrode assembly of a battery of the present invention includes one or more electrodes that are electrically isolated by a separator material. In certain embodiments, as illustrated in FIG. 4, the electrode assembly 44 includes first and second electrodes 82 and 80, wherein one of the electrodes is an anode and the other electrode is a cathode. The electrode assembly 44 is generally configured for even utilization of reactive material by placing the electrodes 80 and 82 in close proximity throughout the electrode assembly in the proportions in which they are utilized. As described herein, the electrodes can be represented in a variety of different configurations.

Figure 7:
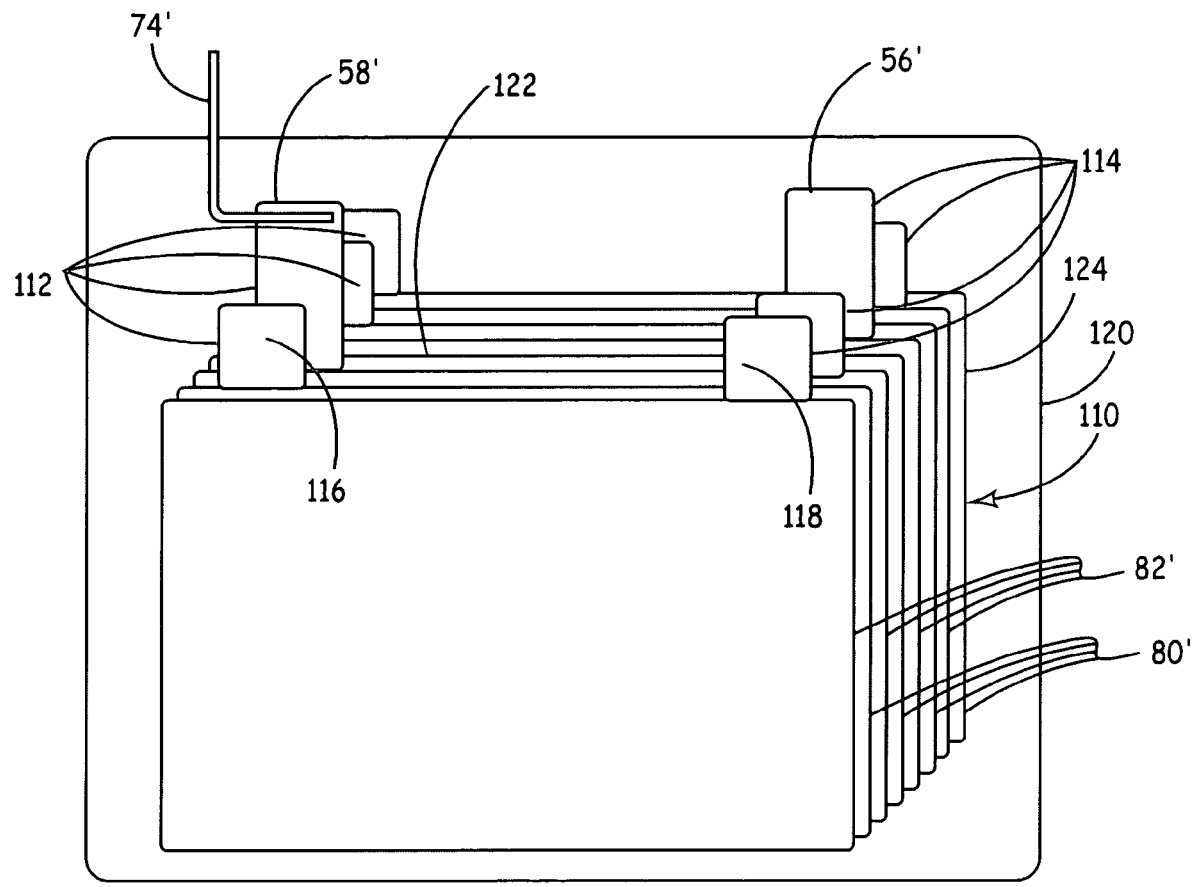
FIG. 7 is a perspective view of a stacked plate electrode in accordance with certain embodiments of the invention.

One such electrode configuration involves each of the electrodes being subdivided over one or more electrode plates connected together. In certain embodiments, as represented in FIG. 7, the electrodes 80' and 82' are comprised of a plurality of individual electrode plates stacked together in an electrode assembly 110. The plates are shown as generally rectangular in shape, but the invention should not be limited as such. Such plates generally have first and second major faces, and when stacked as shown, the major faces of the plates are generally stacked over each other so that the major faces align in an overlapping manner. As also represented in FIG. 7, in certain embodiments, the electrode assembly 110 is comprised of plates of each electrode being stacked together in alternating fashion—cathode electrode plate 82', anode electrode plate 80', cathode electrode plate 82', anode electrode plate 80', etc.

Each electrode plate of the electrode assembly 110 includes at least one tab 112, 114 protruding therefrom. In certain embodiments, the tabs 112, 114 are formed of aluminum. The tabs 112, 114 generally extend out from the electrode assembly 110 so that the tabs are not covered by separator material that envelopes each electrode plate. As noted elsewhere, the separation material typically envelopes each electrode plate, and as such, at least extends proximate to the outer surface of the electrode assembly 110. In FIG. 7, tabs 112 are anode tabs extending from anode electrode plates 80' and tabs 114 are cathode tabs extending from cathode electrode plates 82'. The tabs 112, 114 protruding from the electrode plates 80', 82' are generally extensions of the electrode plate's current collectors and, therefore, are co-planar with their respective electrode plates.

In certain embodiments, as shown, the tabs 112, 114 are specifically located on the electrode plates 80', 82' so that when the electrode assembly 110 is assembled, the anode tabs 112 end up being aligned on one side of the assembly while the cathode tabs 114 end up being aligned on the opposite side of the assembly. The tabs of each electrode are coupled together to provide electrical continuity throughout the respective electrodes. The alignment of the anode tabs 112 assists with their electrical interconnection. Similarly, the alignment of the cathode tabs 114 assists with their electrical interconnection. In order to electrically interconnect a set of tabs 112 or 114, a coupling operation must be performed on them. A number of coupling techniques can be used. One exemplary technique can involve welding techniques to electrically connect the plurality of tabs for a particular electrode together. Other possible coupling techniques include, without limitation, riveting, application of conductive epoxy, connection via a conductive bridge, etc. In coupling the tabs together, electrical connection can thereafter be made to all the electrode plates of the electrode by coupling to any one of the coupled tabs.

As shown in FIG. 7, anode tabs 112 are electrically coupled at coupling point 116 and cathode tabs 114 are electrically coupled at coupling point 118. These points 116 and 118 are approximate locations on each tab 112 and 114 in the assembly 110 that may represent a welding point, a general location of multiple welding points, a rivet point, etc. to electrically interconnect a set of tabs together.

As previously mentioned herein, one of the battery electrodes is operatively coupled to a first feedthrough mechanism (e.g., a feedthrough pin 74'), while the other electrode is often coupled to the encasement 120 (where encasement 120 includes its cover) or alternatively, a second feedthrough pin (not shown). Overall, these couplings are facilitated through the use of the electrode tabs. Thereafter, when the battery is subsequently used, current is able to flow from the electrode plates through the tabs to the corresponding battery electrical contact (e.g., feedthrough pin 74', battery encasement 120).

In "jellyroll" electrode assemblies, resistance spot welding individual electrode tabs to the encasement typically provides the coupling between the electrodes and the encasement. However, in electrode assemblies such as the stack of flat electrode plates shown in FIG. 7, individual electrode tabs 112, 114 are coupled together into a stack. Therefore, individual tabs 112, 114 are generally not readily accessible in order to weld them to the encasement 120. Moreover, it is difficult to weld the entire stack of tabs 112, 114 to the encasement 120. The same predicament is present when trying to weld the stack of tabs 112, 114 to a feedthrough pin 74'. In order to provide coupling of the feedthrough 74' or battery encasement 120 to the electrode tabs 112, 114 in these cases, some batteries can be designed to have one tab of the set of tabs of each electrode extend outward from the rest of the tabs in order to accommodate coupling the electrodes 80', 82' to the battery (feedthrough pin 74' or encasement 120) via the one tabs. In other instances, a tab extension can be coupled on one tab of the set of tabs of each electrode in order to accommodate coupling the electrodes to the battery (feedthrough pin 74' or encasement 120) via the one tabs. As such, as shown in FIG. 7, the anode tabs 112 include one longer anode tab 58' and cathode tabs 114 include one longer cathode tab 56'. In certain embodiments, as shown, electrode plate 122 includes the extended tab 58' protruding therefrom and the tab 58' is accessible to be subsequently coupled to the feedthrough pin 74', and electrode plate 124 includes the extended tab 56' protruding therefrom and the tab 56' is accessible to be subsequently coupled to the encasement 120 (or further feedthrough pin).

As mentioned above, coupling the feedthrough pin 74' to the electrode plate 122 (via the extended tab 58') so that an effective joint can be achieved can be difficult, particularly if the feedthrough pin 74' and tab 58' are made of different materials. However, it is often a necessity to have the pin 74' and tab 58' be different materials to ensure the battery remains hermetic. As such, a general approach to provide effective coupling between the pin 74' and tab 58' is to initially manipulate the tab 58' and/or pin 74' in some fashion in order to subsequently provide an acceptable joint between the tab 58' and pin 74'. One well-known approach for coupling tabs to dissimilar feedthrough pins involves using a multi-bend tab with a slit for the feedthrough pin. This assembly is then resistance spot welded. The bent tab provides strain relief and reduces load experienced at the weld joint. Another known approach involves crimping or welding a metal tube over the pin to provide a material that is more suited for welding thereto. Alternatively, weldable tabs may be crimped and subsequently welded to the pin. Overall, these approaches have severe material limitations, especially when involving feedthrough pins having glassed or brazed materials.

Embodiments disclosed herein generally involve coupling the feedthrough pin 74' to the tab 58' using laser welding. The coupling is accomplished without manipulation of the pin 74' (provided in the shape of an "L") or tab 58' (in contrast to well-known manipulation methods mentioned herein). While such prior coupling processes have been found to be highly sensitive to manufacturing variability (e.g., associated with surface conditions of the feedthrough pin, particularly when the pin material (for example, aluminum containing titanium alloys, e.g., $Ti_6Al_4V$) is selected for its properties of being less prone to the corrosive effects of the material contained within the battery), it has been found that laser welding as embodied herein provides joints that are more robust. As such, through this process, one is able to provide stable (less variability in joint strength) and high manufacturing yields.

Embodiments of the invention involving laser welding, as described herein, allow for large tolerances with respect to positioning of the tab 58' and pin 74', and allow for flexibility in determining weld position and weld size. In addition, using such laser welding methods, contact between the laser and items being coupled is not required, as would generally be required with other coupling methods (e.g., resistance spot welding). Thus, with electrical resistance being negligible, the laser welding methods can be performed using increased power, while expending less energy. Also, embodiments of the invention provide for the weld spot to be repeatable, allowing for consistent weld joint properties. Further, not only do the welding processes of the invention enable fabricating robust weld joints for dissimilar materials (metals) making up the tab 58' and pin 74' but also for the mismatched thicknesses of the tab 58' and pin 74' being coupled.

In certain embodiments, as shown in FIG. 8, prior to the coupling process, a battery coil 130 (including, with reference to FIGS. 3 and 5, electrode assembly 44, separation material 84, and case liner 62) and a battery header 132 (including, with reference to FIGS. 3 and 5, feedthrough assembly 68, coil and head space insulators 50 and 64, and battery cover 46) are provided as a joined unit 134, wherein a feedthrough pin 74' extends downward from the battery header 132 and a tab 58' of one of the electrodes (e.g., the anode) extends upward from the battery coil 130. In certain embodiments, the battery coil 130 is of a rechargeable (secondary) lithium-ion battery and the tab 58' is formed of lithium ion aluminum. As shown, the tab 58' is not manipulated (bent, slotted, etc.). Likewise, the pin 74' is unaltered (not manipulated) save for its distal end 78' being bent to extend across the tab 58'. A first bore 136 is defined by the battery header 132, whereby the first bore 136 accommodates the area in which the pin 74' extends across the tab 58'. The first bore 136 enables the area where the pin 74' extends across the tab 58' to be accessible for coupling. Using the coupling methods described herein, the pin 74' can be generally oriented with respect to the tab 58' as desired. In certain embodiments, as shown in FIG. 9, if the orientation of the pin 74' with respect to the tab 58' is defined as a base orientation when the pin 74' is generally parallel with an upper edge 140 of the tab 58', the positioning of the pin 74' with respect to the tab 58' can be varied generally horizontally up to about 45 degrees in either an upward direction 142 or a downward direction 144 (totaling a total variability of 90 degrees), while still enabling sufficient coupling of the pin 74' and tab 58'.

In certain embodiments, as shown in FIG. 8, a second bore 138 is also defined by the battery header 132. If warranted, the second bore 138 accommodates the area in which a further tab 56' is accessible for coupling. In certain embodiments, the further tab 56' is of the other electrode (e.g., the cathode) of the battery coil 130 and is formed of lithium ion nickel. By inclusion of this second bore 138, the further tab 56' can be optionally coupled to another feedthrough pin (not shown) or, as shown, to the battery encasement (the battery cover) via a coupling 79' extending from the battery encasement. As shown, the further tab 56' is oriented so that it extends on top of the coupling 79'. Alternatively, if another feedthrough pin is coupled to this further tab 56', such pin can also be generally oriented with respect to the tab 58' as described above. While not specifically described, in certain embodiments, coupling of the tab 58' is laser welded to the coupling 79' (or a further feedthrough pin) in the same fashion as that described herein with respect to the coupling of the tab 58' with the feedthrough pin 74'. As can be appreciated, the unit 134 formed by the joining of the electrode assembly 130 and coil insulator 132 has no enclosure to keep them together. As such, any of a number of mechanisms (not shown) may be used to hold electrode assembly 130 and coil insulator 132 together, including clamps, clips, tape, and the like.

Figure 10:
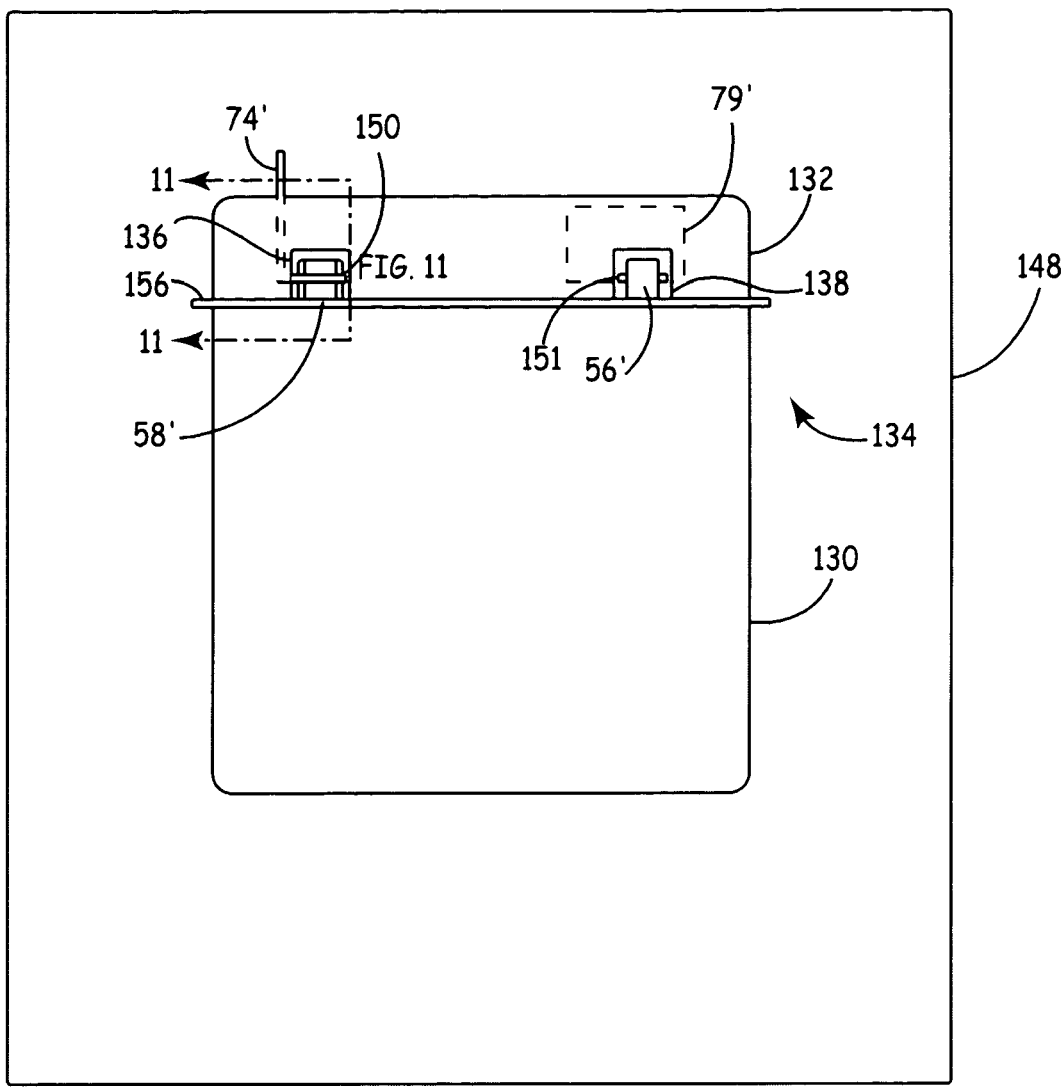
FIG. 10 is a plan view of a joined unit of an electrochemical cell and platform in accordance with certain embodiments of the invention.
Figure 11:
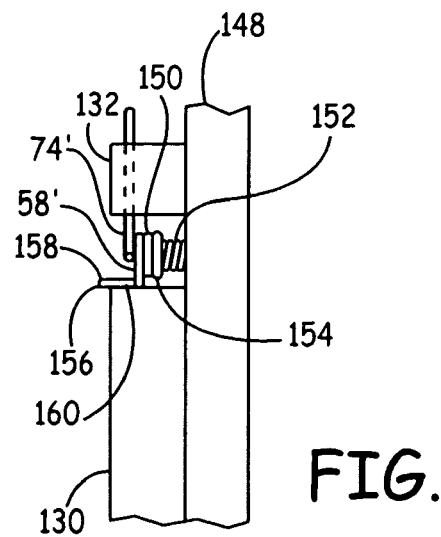
FIG. 11 is an enlarged sectional view of a portion of FIG. 10 taken along the lines of 11-11 of FIG. 10.

Prior to the tab 58' and pin 74' being coupled, the unit 134 is laid down on one of its major faces so that the bores 136 and 138 are oriented upward, as shown in FIG. 8, with the pin 74' portion extending across the tab 58' being located above the tab 58' and the coupling 79' portion extending across the tab 56' being located below the tab 56'. The unit 134 is generally positioned on a platform 148 with the tab 58' contacting a heat sink 150 on the platform 140, shown in FIGS. 10 and 11. The heat sink 150 is generally supported by a linear actuator (as exemplified by spring 152) located underneath the heat sink 150. In certain embodiments, the linear actuator is coupled between the platform 148 and the heat sink 150. In alternative embodiments, as shown in FIG. 11, the linear actuator is coupled between the platform 148 and a support 154. In turn, the support 154 is located between the heat sink 150 and spring 152 to add to the stability of the heat sink 150 when acted on by the tab 58'. In turn, upon positioning the unit 134 on the platform 148 so that the tab 58' contacts the heat sink 150, the tab 58' exerts downward pressure on the heat sink 150, which in turn exerts downward pressure on the support 154, which in turn compresses the spring 152. As such, when the unit 134 is placed in position, the spring 152 functions to force the tab 58' against the pin 74' to provide contact between the bodies without biasing the pin 74'. As shown, in certain embodiments, an assembly including a heat sink 151, with linear actuator assembly and optional support, contacts the coupling 79' and is used in coupling the coupling 79' to the tab 56'.

In certain embodiments, the heat sink 150 is a copper electrode; however, it should not be limited as such so long as it sufficiently functions as a heat sink for the laser welding process. In addition, the support 154, if used, can be any of a number of materials so long as it does not interfere with the welding process. Further, the size of the linear actuator can be selected as desired. The spring 152 exemplifies the linear actuator, and is deemed to be a sufficient size, so long as it provides enough compressibility to provide contact between the tab 58' and pin 74', but not so much as to provide excess pressure on the tab 58' (e.g., forcing the tab 58' to buckle under the pressure exerted). In embodiments in which the heat sink 151 and linear actuator assembly and optional support are used in coupling the coupling 79' to the tab 56', the above teachings likewise apply.

In certain embodiments, a shield 156 is also utilized. The shield 156 is a thin body, enabling it to slide between the battery coil 130 and battery header 132. When positioned accordingly, the shield 156 prevents exposure of the separation material of the battery coil 130 to the laser weld process. In addition, when positioned, the shield 156 contacts the tabs 58' and 56', ensuring the tabs 58' and 56' contact their respective heat sinks, and also straightening the tabs 58' and 56' if deflected too severely from their contact with the heat sinks. As shown in FIG. 11, the shield 156 has first and second major faces 158 and 160 respectively, where the first major face 158 (generally oriented away from the battery coil 130) is of a material (e.g., steel) that can withstand laser radiation to serve as an adequate shield for the battery coil 130. The second major face 160 (generally oriented toward the battery coil 130) is of a material (e.g., Teflon tape) with low thermoconductivity that can prevent overheating of the battery coil 130. It should be appreciated that other like materials can alternatively be used for either of the first and/or second major faces 158, 160 without departing from the spirit of the invention.

In certain embodiments, at least one of the tabs 58' and 56' includes more than one tab extending upward from the battery coil 130. In turn, if the tab 58' includes more than one tab, when positioned with respect to the feedthrough pin 74', the tabs of the tab 58' are located below the pin 74' portion that extends across the tab 58'. Similarly, if the tab 56' involves more than one tab, when positioned with respect to the coupling 79' (or a further feedthrough tab), the tabs of the tab 56' are located above the coupling 79' (or a further feedthrough tab).

Once positioned as described above, the unit 134 is secured in place. As can be appreciated, the unit 134 can be secured to the platform 148 using any of a number of securing mechanisms (not shown), including clamps, clips, weights, tape, etc. Once secured appropriately, a contact point between the pin 74' and tab 58' (and/or a contact point between the coupling 79' and tab 56') is laser welded to provide coupling between the bodies. Laser welding methods are generally known in the art. In certain embodiments, the laser welding method involves using a Nd-YAG laser; its use being well-known in welding applications for a wide range of materials. Such a Nd-YAG laser apparatus is commercially available from GSI Lumonics, located in Northville, Mich., U.S.A. The welding method involves coupling the pin 74' and tab 58' (and/or the coupling 79' and tab 56') in one or more locations. In certain embodiments, to provide a more robust coupling of the pin 74' and tab 58' (and/or the coupling 79' and tab 56'), the welding method involves coupling in at least two locations. Used with the laser welding apparatus is laser measurement instrumentation for measuring variables including power, energy, beam profile, and spectrum. In certain embodiments, such instrumentation can involve the LaserStar product, commercially available from Ophir Optronics, located in Wilmington, Mass., U.S.A. In certain embodiments, power is set in the range of between about 26 watts and 42 watts, with the pulse rate being set at about 20 hertz and 1 milliseconds for welding the tab 58' to the pin 74' and at about 10 hertz and 8 milliseconds for welding the tab 56' to the coupling 79'.

A cover gas is additionally provided in the laser welding area(s) at a certain flow rate range so as to create a non-oxidizing environment for welding. In certain embodiments, the cover gas is argon, but the invention should not be limited to such. Other inert gases could be used just as well, including, for example, helium. In certain embodiments, the flow rate range is between about 115 cubic feet per hour and about 135 cubic feet per hour, but can be adjusted as desired to minimize weld discolorization. Generally, to be acceptable, the weld(s) tend to exhibit a shiny appearance or are shiny blue and/or purple in color.

Because the unit 134 is oriented so that the pin 74' portion extending across the tab 58' is exposed, the weld can be microscopically inspected before removing the unit 134 from the platform 148 to ensure that the weld is acceptable. In certain embodiments, the weld is inspected at a magnification of at least 10×. In addition, because the portion of the pin 74' extending across the tab 58' is exposed, one can precisely select the position and size of the weld before the pin 74' and tab 58' are welded together. As such, the method offers much variability with respect to coupling the pin 74' and tab 58' together. After the laser welding, upon passing inspection, the tensile strength of the weld(s) is tested. In certain embodiments, such weld tensile strength is tested using a Lloyd LF500 gauge, commercially available from Analis, located in Namur, Belgium. In certain embodiments, for weld(s) with respect to the tab 58', the failure threshold is 1 pound, whereas for weld(s) with respect to the tab 56', the failure threshold is 3 pounds.

Figure 12:
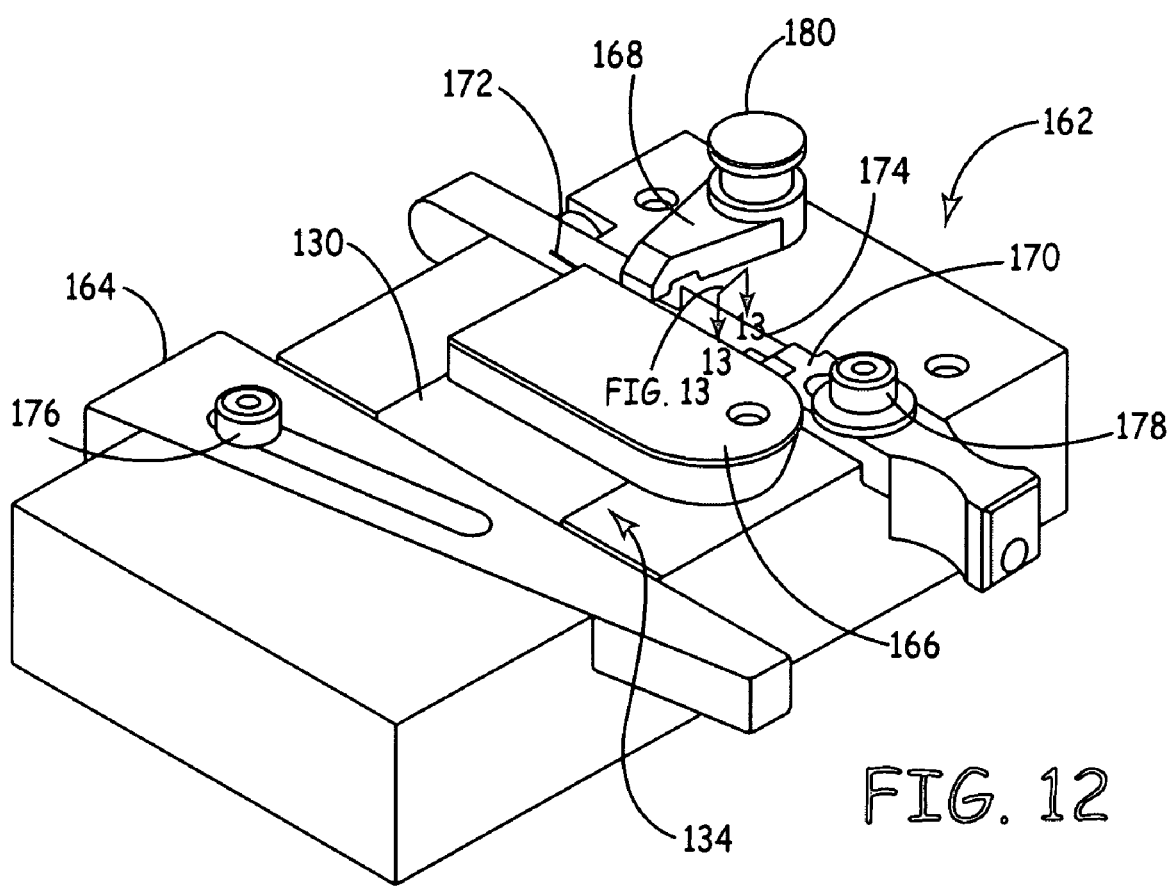
FIG. 12 is a perspective view of a joined unit of an electrochemical cell and weld fixture in accordance with certain embodiments of the invention.

In certain embodiments, as shown in FIG. 12, a fixture 162 may be used to retain the unit 134 during the laser welding process. As such, the fixture 162 would include one or more securing mechanisms to hold the unit 134 together and secure the unit 134 in position. In certain embodiments, as exemplified, the fixture 162 uses clamps as the securing mechanisms; however, the invention should not be limited as such since the fixture 162 could also utilize other mechanisms to sufficiently hold/secure the unit 134 (e.g., clips, weights, tape, etc.). In certain embodiments, the fixture 162 uses four such clamps, a lower clamp 164, a middle clamp 166, and upper left and right clamps 168, 170. As should be appreciated, the number of securing mechanisms can be varied for the fixture 162, and FIG. 12 is used to illustrate one embodiment of such. As previously described herein with respect to the platform 148 of FIGS. 10 and 11, an assembly including heat sink 182 with spring 184 and optional support 186 are also included on the fixture 162, designed and used similarly to what has already been described herein. As such, when positioning the unit 134 on the fixture 162, one will have the tab 58' (located in space 174; shown in FIG. 13) contact such heat sink 150 when secured to the fixture 162. Additionally, in certain embodiments, a shield 172 is similar positioned and used to protect the separation material of the battery coil 130 of the unit 134 during the laser weld operation.

Figure 13:
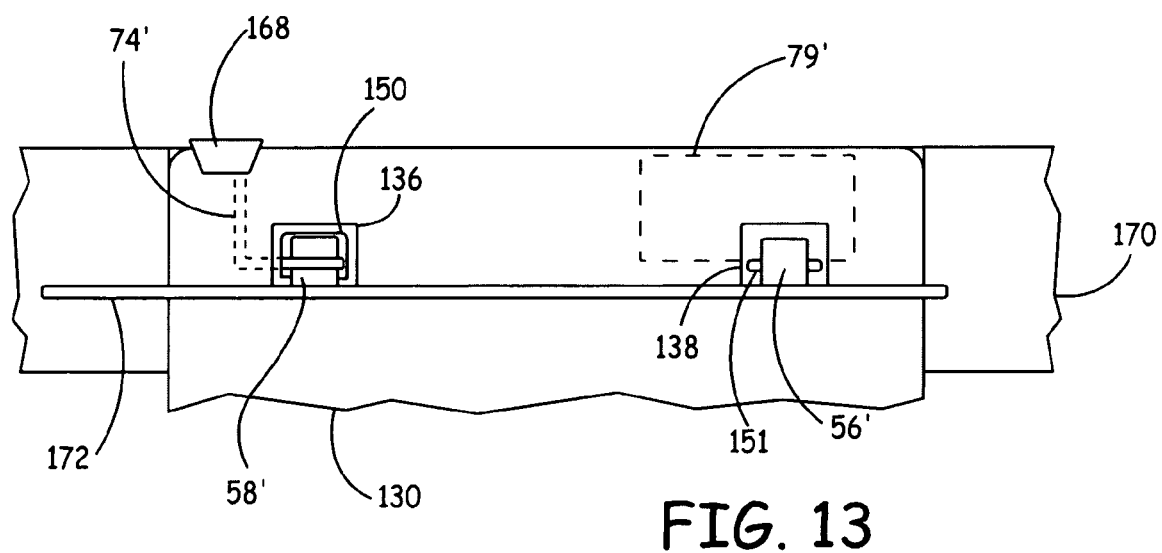
FIG. 13 is a plan elevation view showing a partial sectional view of FIG. 12 taken along the lines 13-13 of FIG. 12.

In loading the unit 134 on the fixture 162, the unit 134 is laid down so that, as shown in FIG. 13, the bores 136, 138 are oriented upward, with the portion of the pin 74' extending across the tab 58' located above the tab 58' and the tab 56' located above the coupling 79'. The unit 134 is laid down so that the tabs 58' and 56' come in contact with their respective heat sinks as described above. The positioning of the clamps 164, 166, 168, and 170 are subsequently adjusted to appropriate positions, as shown in FIG. 12, to secure the unit 134 to the fixture 162. Generally, a first nut 176 retaining the position of the lower clamp 164 is loosened so that the clamp 164 can be positioned to contact a bottom face of the unit 134. Once the lower clamp 164 is in position, the first nut 176 is tightened to prevent any horizontal movement of the unit 134 toward the clamp 164. The free portion of the middle clamp 166 is rotated so as to be positioned over the unit 134, preventing any vertical movement of the unit 134. A second nut 178 retaining the position of the right clamp 170 is loosened so that the clamp 170 can be positioned to contact a right face of the unit 134. Once the right clamp 170 is in position, the second nut 178 is tightened to prevent any horizontal movement of the unit 134 toward the clamp 170. A retaining member 180 retaining the position of the left clamp 168 is lifted so that the clamp 168 can be positioned to contact an upper face of the unit 134. Once the left clamp 168 is in position, the retaining member 180 is released to secure and prevent any vertical movement of the unit 134 toward the clamp 168. The shield 172 is then lowered to accordingly cover the separation material of the battery coil 130 of the unit 134 during the laser weld operation.

Once the unit 134 is accordingly positioned and secured in the fixture 162, a contact point between pin 74' and tab 58' (located in space 174; shown in FIG. 13) and/or a contact point between the coupling 79' and tab 56' are laser welded to provide coupling between the bodies. Such laser welding procedures previously described herein, using similar apparatus and procedures, are similarly used. Again, because the unit 134 is positioned and secured so that the pin 74' portion extending across the tab 58' and the tab 56' are exposed (located in space 174; shown in FIG. 13), the welds can be visually inspected before removing the unit 134 from the fixture 162 to ensure that the weld is acceptable. In addition, because the pin 74' portion extending across the tab 58' and the tab 56' are exposed (located in space 174; shown in FIG. 13), one can precisely select the position and size of the weld before the pin 74' and tab 58' and/or the tab 56' and coupling 79' are welded together. As such, the method again offers much variability with respect to coupling the pin 74' and tab 58' and/or the tab 56' and coupling 79' together.

It will be appreciated the present invention can take many forms and embodiments. The true essence and spirit of this invention are defined in the appended claims, and it is not intended the embodiment of the invention presented herein should limit the scope thereof.

The invention claimed is:

1. A method of manufacturing an electrochemical cell, comprising:
   providing a battery coil having an electrode assembly, the electrode assembly having one or more electrodes, each of the one or more electrodes having a tab extending therefrom;
   providing a battery header having a first feedthrough assembly, the first feedthrough assembly having a first feedthrough pin extending therefrom;
   joining the battery coil with the battery header so as to form a joined unit whereby the first feedthrough pin of the battery header extends across a first tab of the battery coil;
   providing a platform for positioning the joined unit, wherein the platform has a plurality of securing mechanisms used to prevent movement of the joined unit during the laser welding; and
   coupling the first feedthrough pin to the first tab by laser welding at a point where the first feedthrough pin contacts the first tab.

2. The method of claim 1, wherein the step of coupling the first feedthrough pin to the first tab further involves the step of manipulating the first feedthrough pin and the first tab, wherein such manipulation involves orienting only a connection portion of the feedthrough pin so that only the connection portion of the first feedthrough pin extends across the first tab.

3. The method of claim 1, wherein the step of coupling the first feedthrough pin to the first tab further involves orienting the first feedthrough pin so that the first feedthrough pin extends across the first tab in at least one position, wherein the at least one position lies within a 90 degree orientation on the first tab.

4. The method of claim 1 wherein the step of providing the platform further includes providing at least one heat sink on the platform, wherein the joined unit is positioned on the platform so that the first tab contacts one of the at least one heat sink.

5. The method of claim 4, wherein the step of providing the platform further includes supporting the one heat sink with a linear actuator, wherein the linear actuator is located between the platform and the one heat sink so the one heat sink can deflect when contacted by the tab, and wherein the linear actuator is of a certain size in order to limit amount of deflection by the one heat sink to create contact between the first tab and the first feedthrough pin.

6. The method of claim 1 wherein the step of providing the platform further includes providing a shield used to protect the battery coil during laser welding of the first feedthrough pin and the first tab.

7. The method of claim 1, wherein the battery header further includes one of a coupling and a second feedthrough assembly having a second feedthrough pin extending therefrom, wherein the one of the coupling and the second feedthrough pin is coupled to a second tab of the battery coil.

8. The method of claim 7, wherein the battery header further includes at least one coupling, wherein the coupling is of nickel and the second tab is of aluminum.

9. A method of manufacturing an electrochemical cell, comprising:
   providing an battery coil having an electrode assembly, the electrode assembly having one or more electrodes, each of the one or more electrodes having a tab extending therefrom;
   providing a battery header having a first feedthrough assembly, the first feedthrough assembly having a feedthrough pin extending therefrom;
   joining the battery coil with the battery header so as to form a joined unit whereby a first feedthrough pin of the battery header extends across a first tab of the battery coil and at least one of a coupling and a second feedthrough pin;
   providing a platform for the joined unit, the platform having a plurality of securing members, a heat sink, and a shield;
   positioning the joined unit on the platform so that the first tab contacts the heat sink;
   securing the joined unit to the platform using one or more securing members;
   positioning the shield so as to protect the battery coil during coupling of the first feedthrough pin and the first tab; and
   coupling the first feedthrough pin to the first tab by laser welding at a point where the first feedthrough pin contacts the first tab.

10. The method of claim 9, wherein the step of securing the joined unit includes using the securing members to prevent vertical or horizontal movement of the joined unit.

\* \* \* \* \*